United States Patent
Varga (10) Patent No.: US 10,636,120 B2
(45) Date of Patent: Apr. 28, 2020

(54) IMAGE SCALING WITH QUALITY CONTROL

(71) Applicant: John Thomas Varga, Longmont, CO (US)

(72) Inventor: John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 15/886,695

(22) Filed: Feb. 1, 2018

(65) Prior Publication Data

US 2019/0236756 A1    Aug. 1, 2019

(51) Int. Cl.
*G06T 3/40* (2006.01)
*G06T 7/00* (2017.01)

(52) U.S. Cl.
CPC .............. *G06T 3/4023* (2013.01); *G06T 3/40* (2013.01); *G06T 7/0002* (2013.01); *G06T 2207/30168* (2013.01)

(58) Field of Classification Search
CPC .............................. G06T 3/4023; G06T 7/0002
See application file for complete search history.

(56) References Cited

U.S. PATENT DOCUMENTS

| | | | |
|---|---|---|---|
| 6,144,772 A * | 11/2000 | Garland ................... | G06T 9/007 378/37 |
| 7,706,635 B2 | 4/2010 | Keithley et al. | |
| 7,988,248 B2 | 8/2011 | Silverbrook et al. | |
| 8,213,045 B2 | 7/2012 | Motoyama | |
| 8,422,082 B2 | 4/2013 | Couwenhoven et al. | |
| 8,538,199 B2 | 9/2013 | Ernst et al. | |
| 9,076,099 B2 | 7/2015 | Stanich et al. | |
| 9,361,554 B2 | 6/2016 | Stanich et al. | |
| 2003/0039408 A1 * | 2/2003 | Smith ................... | H04N 19/172 382/298 |
| 2005/0068338 A1 * | 3/2005 | Zeng ...................... | G06T 3/4084 345/660 |
| 2008/0037880 A1 * | 2/2008 | Lai ........................ | H04N 19/172 382/232 |
| 2008/0204819 A1 * | 8/2008 | Chiba ................... | H04N 1/3935 358/452 |
| 2008/0266310 A1 * | 10/2008 | Chalmers .............. | G06T 3/4015 345/589 |

(Continued)

FOREIGN PATENT DOCUMENTS

| | | |
|---|---|---|
| CN | 102999886 A | 1/2016 |
| JP | 5217548 B2 | 6/2013 |
| JP | 5968145 B2 | 8/2016 |

*Primary Examiner* — Ming Y Hon
(74) *Attorney, Agent, or Firm* — Duft & Bornsen, PC (57) ABSTRACT

Systems and methods are provided for image scaling with quality control. One embodiment is an image scaling system that includes a processor configured to receive an instruction to scale an input image by a scale factor to create an output image. The processor is configured to determine an integer quality level to use in scaling the input image to create the output image, to divide the input image into regions of consecutive pixel pairs based on the scale factor and the integer quality level, and to determine region factors corresponding to each of the regions. The processor is further configured to scale the input image by applying the region factors to pairs of pixels in the corresponding regions of the input image to create output pixels in the output image.

20 Claims, 10 Drawing Sheets

(56) References Cited

U.S. PATENT DOCUMENTS

| | | | |
|---|---|---|---|
| 2010/0079141 A1* | 4/2010 | Stemmer | G01R 33/4824 324/309 |
| 2011/0141319 A1* | 6/2011 | Watazawa | H04N 5/23219 348/240.2 |
| 2012/0201476 A1* | 8/2012 | Carmel | H04N 19/176 382/239 |
| 2013/0124980 A1* | 5/2013 | Hudson | G06F 17/21 715/243 |
| 2014/0233071 A1* | 8/2014 | Kido | H04N 1/00013 358/3.26 |
| 2015/0213341 A1 | 7/2015 | Stanich et al. | |
| 2015/0262332 A1* | 9/2015 | Park | G06T 3/4084 345/660 |
| 2015/0339276 A1* | 11/2015 | Bloem | H04L 67/42 715/234 |

* cited by examiner

IMAGE SCALING WITH QUALITY CONTROL

FIELD

This disclosure relates to scaling digital images.

BACKGROUND

Image scaling refers to expanding (i.e. upscaling) or reducing (i.e. downscaling) an input image to create an output image. When the output image is to become larger than the input image, pixels are added at certain positions in the two-dimensional array of pixels of the input image to create the resulting output image. Similarly, when the output image is to become smaller than the input image, some pixels are removed from the two-dimensional array of pixels of the input image to create the output image.

Consider, for example, scaling a 4×4 pixel (i.e., 16 total pixels) input image into a 10×10 pixel (i.e., 100 total pixels) output image. Since the size of the output image is not an exact integer multiple (two times, three times, etc.) of the input image size, it is not adequate to simply reuse/copy all of the pixels from the input image to create the output image. Instead, some pixels of the input image may be replicated more times than other pixels of the input image. Choosing which pixels from the input image to replicate (or skip, in the case of downscaling) is the subject of various techniques for scaling images.

Image scaling techniques that produce highly accurate output images generally sample/read pixels from fractional positions in the input image and/or incorporate weighted averages for areas in the input image. Although accurate, such techniques are computation-intensive and thus incur undesirable costs in time and expense for many real-world applications. For instance, in the field of printing where pixel values may be represented by eight bits (i.e., 256 different color values), resizing pixels to highly precise floating-point values may take significant processing resources which is not reflected in the quality of the printed output and delays the overall time to print. On the other hand, more basic techniques for scaling images that are based on linear interpolation (e.g., nearest neighbor scaling or Bresenham scaling) are less computation-expensive, but sometimes produce bands or stripes, referred to as artifacts, in the output image. Thus, current image scaling techniques are often either too computationally expensive or too inaccurate with no middle ground.

SUMMARY

Embodiments described herein provide for image scaling with quality control. A user can establish a level of quality in scaling an input image into an output image. The quality level is an integer and its power of two is used to section the input image into regions. Each region has different factors that are approximated for the region, and the factors are applied to a run of pixels that belong to the region. As such, fewer computations may be performed on the input image when the quality level is a lower integer. Moreover, when the quality level is increased, pixels from the input image may be blended using integer multiplication and bit shifting division, thereby producing a higher quality output image (e.g., to eliminate artifacts) without the processing burden which would result from performing floating point calculations.

One embodiment is an image scaling system that includes a processor configured to receive an instruction to scale an input image by a scale factor to create an output image. The processor is configured to determine an integer quality level to use in scaling the input image to create the output image, to divide the input image into regions of consecutive pixel pairs based on the scale factor and the integer quality level, and to determine region factors corresponding to each of the regions. The processor is further configured to scale the input image by applying the region factors to pairs of pixels in the corresponding regions of the input image to create output pixels in the output image.

In another embodiment, the processor is configured to determine a first factor and a second factor to apply to each of the regions based on a power of two of the integer quality level, wherein the first factor of a first region is a power of two of the integer quality level and decrements by one for subsequent regions, and wherein the second factor of the first region is zero and increments by one for subsequent regions. In another embodiment, the processor is configured to scale the input image by applying the first factor and the second factor to pairs of pixels in the input image to create output pixels in the output image. In another embodiment, in response to determining that the first factor is decremented to one, the processor is configured to reset the first factor to the power of two of the integer quality level, to reset the second factor to zero, and to assign the first factor and the second factor to a subsequent region. For further regions after the subsequent region, the processor is configured to iteratively decrement the first factor and increment the second factor.

In yet another embodiment, the processor is configured to determine a number of pixels to belong to each of the regions by dividing an inverse of the power of two of the integer quality level by the scale factor per pixel.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
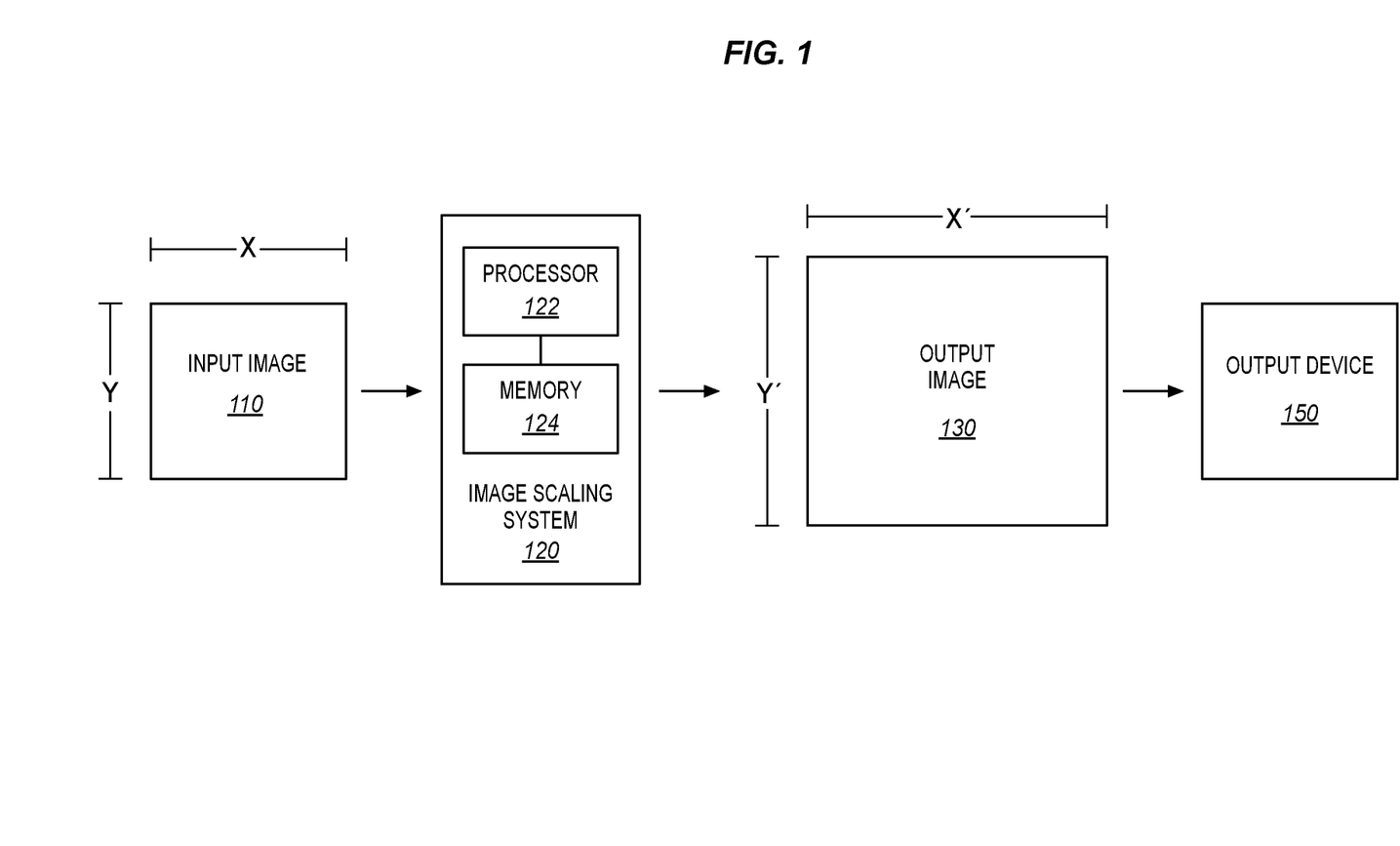
FIG. 1 illustrates an image scaling system in an illustrative embodiment.

FIG. 1 illustrates an image scaling system 120 in an illustrative embodiment. The image scaling system 120 may be any system, device, circuitry and/or other suitable component that is operable to scale an input image 110 of X*Y resolution into an output image 130 of X'*Y' resolution. The image scaling system 120 may scale the input image 110 up or down and by any number of scaling factors including non-integer scaling factors. As described in greater detail below, the image scaling system 120 is enhanced with adaptable quality control in scaling the input image 110 to the output image 130 to achieve an optimal balance between processing cost and image quality. After converting the input image 110 into the output image 130, the image scaling system 120 transfers the scaled output image 130 to an output device 150 for presentation of the output image 130. Examples of the output device 150 include printers, display screens, digital cameras, etc.

In one embodiment, the image scaling system 120 is implemented by a processor 122 communicatively coupled to a memory 124. The processor 122 includes any electronic circuits and/or optical circuits that are able to perform functions. For example, the processor 122 may include one or more Central Processing Units (CPU), Graphics Processing Units (GPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc. The memory 124 includes any electronic circuits, optical circuits, and/or magnetic circuits that are able to store data. For instance, the memory 124 may include one or more volatile or non-volatile Dynamic Random Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM. The image scaling system 120 may be configured as part of the output device 150 or external thereto.

Figure 2:
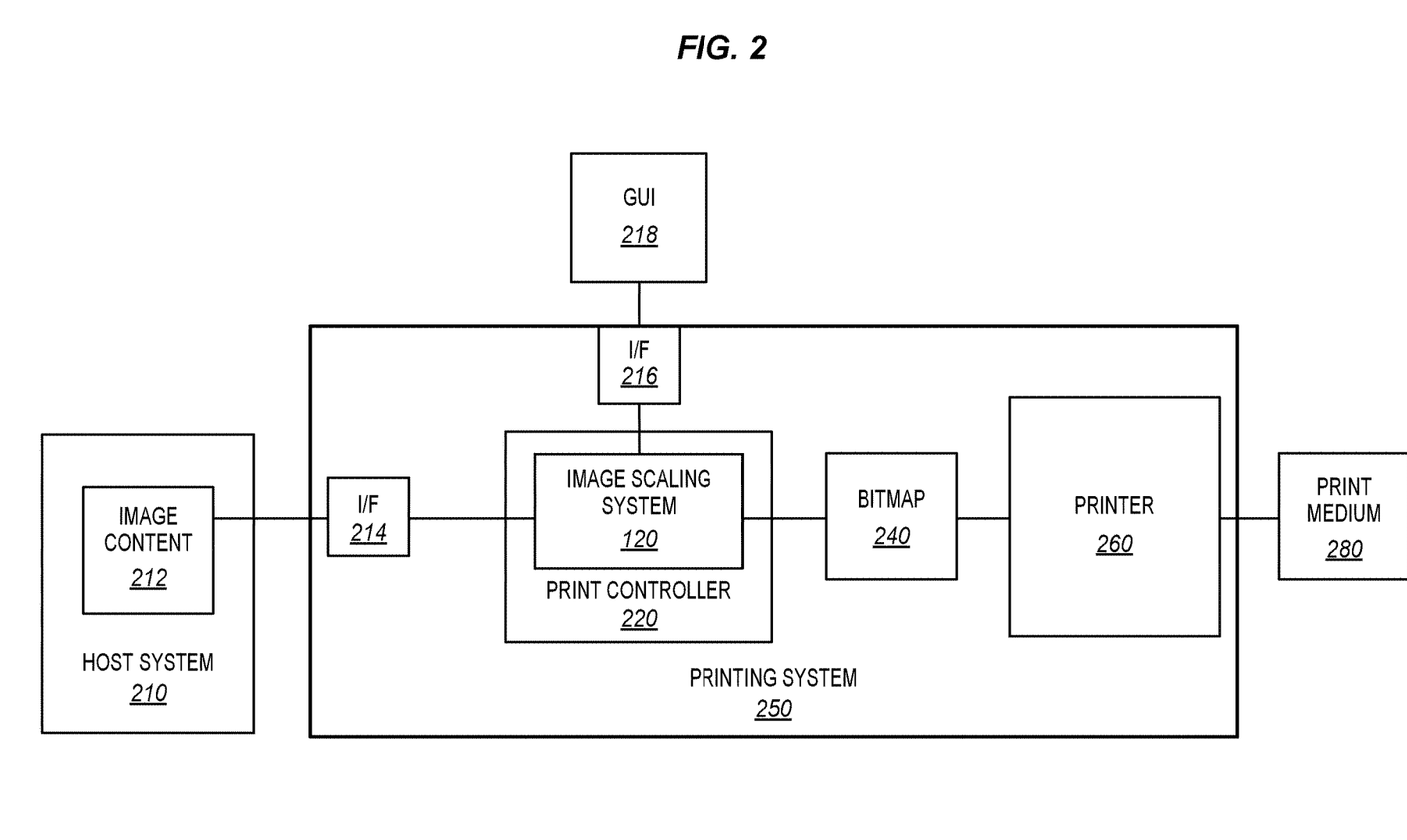
FIG. 2 is a block diagram illustrating a printing system using an image scaling system in an illustrative embodiment.

FIG. 2 is a block diagram illustrating a printing system 250 using the image scaling system 120 in an illustrative embodiment. A host system 210 is in communication with the printing system 250 to print image content 212 onto a print medium 280 via a printer 260. The resulting print medium 280 may be printed in color and/or in any of a number of gray shades. The host system 210 may comprise any computing device, such as a personal computer or a server. The image content 212 may be any file or data (e.g., print job data) that describes how an image on a sheet of print medium is to be printed. For example, the image content 212 may include PostScript data, Printer Command Language ("PCL") data, the Intelligent Printer Data Stream ("IPDS") data, and/or any other printer language data. Alternatively or additionally, the printing system 250 may compose the image content 212 using a Printer Definition Language (e.g., Portable Document Format (PDF) or IPDS) and Job Tickets (for non-IPDS). As such, the printing system 250 may create a first bitmap and scale it to a second bitmap. Alternatively or additionally, the printing system 250 may produce the first bitmap at the desired scaling and further adjust the scaling according to a paper shrinkage amount resulting from the printing process (e.g. the paper getting wet with ink and then being dried), so that the front side of the paper web can align with the back side (e.g. the back side of the paper is printed after the paper shrinks due to the printing process on the front side of the paper) or so that the printed output ends up at the intended size and/or alignment.

The print controller 220 (e.g. DFE, Digital Front End) may be any system, device, circuitry, and/or other suitable component operable to control the printer 260 based on print data received from the host system 210. In doing so, the print controller 220 may transform the image content 212 into a bitmap 240, and transmit the bitmap 240 to the printer 260 which uses it to imprint onto the print medium 280 (e.g., via toner, ink, etc.). The image scaling system 120 may be configured as part of the print controller 220 and/or any other portion of the printing system 250. In some embodiments, the image scaling system 120 may be configured with the host system 210.

The image scaling system 120 may scale the image content 212 to generate the bitmap 240 according to scaling techniques described in greater detail below. The image scaling system 120 and/or the print controller 220 may be communicatively coupled with the host system 210 via an interface 214, and may also be communicatively coupled to a Graphical User Interface (GUI) 218 via interface 216. The interface(s) 214/216 may be any system, device, or component to receive image data, print data, and/or user input (via keyboard, mouse, display screen, etc., input via GUI 218). The print medium 280 may be continuous form paper, cut sheet paper, and/or any other medium suitable for printing. The printing system 250 may be a high-speed printer operable to print relatively high volumes (e.g., greater than 100 pages per minute). Illustrative details of the operation of the image scaling system 120 will be discussed with regard to FIG. 3.

Figure 3:
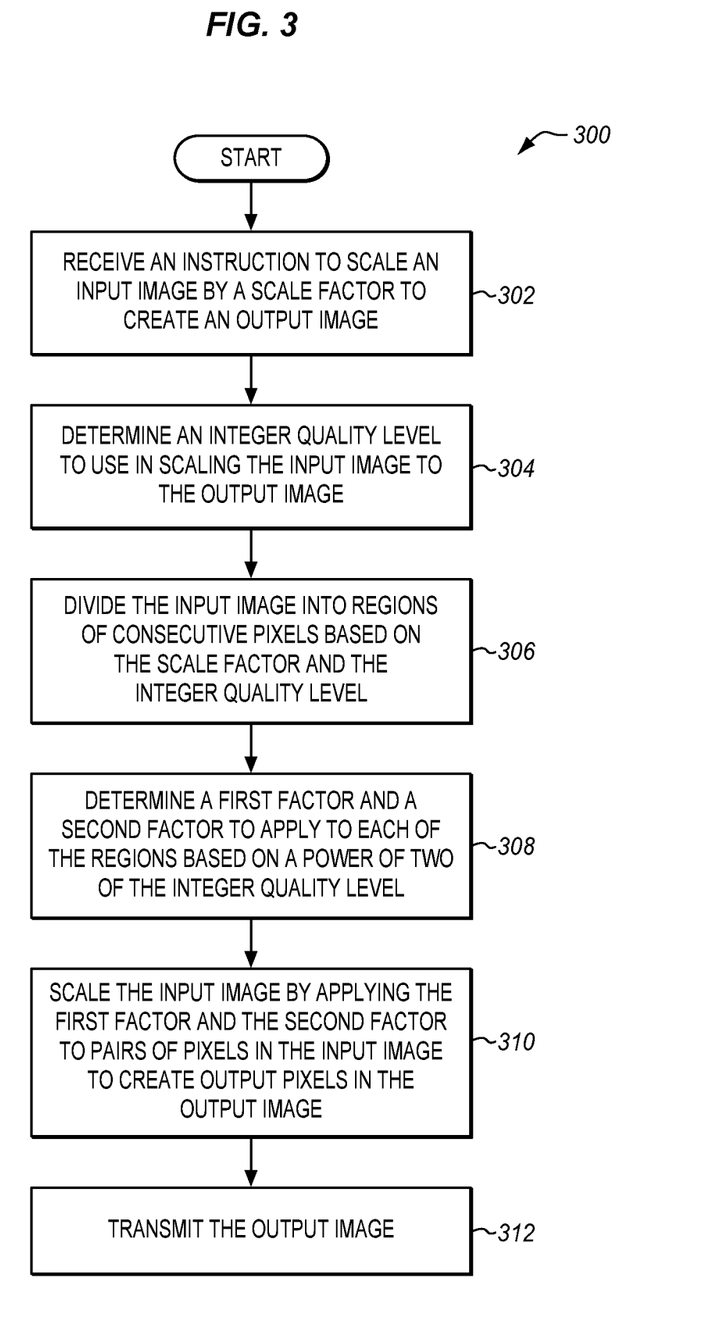
FIG. 3 is a flowchart illustrating a method for scaling an image in an illustrative embodiment.

FIG. 3 is a flowchart illustrating a method 300 of scaling an image in an illustrative embodiment. The steps of method 300 are described with reference to the image scaling system 120 of FIG. 1 and printing system 250 of FIG. 2, but those skilled in the art will appreciate that method 300 may be performed in other systems. The steps of the flowcharts described herein are not all inclusive and may include other steps not shown. The steps described herein may also be performed in an alternative order.

Figure 4:
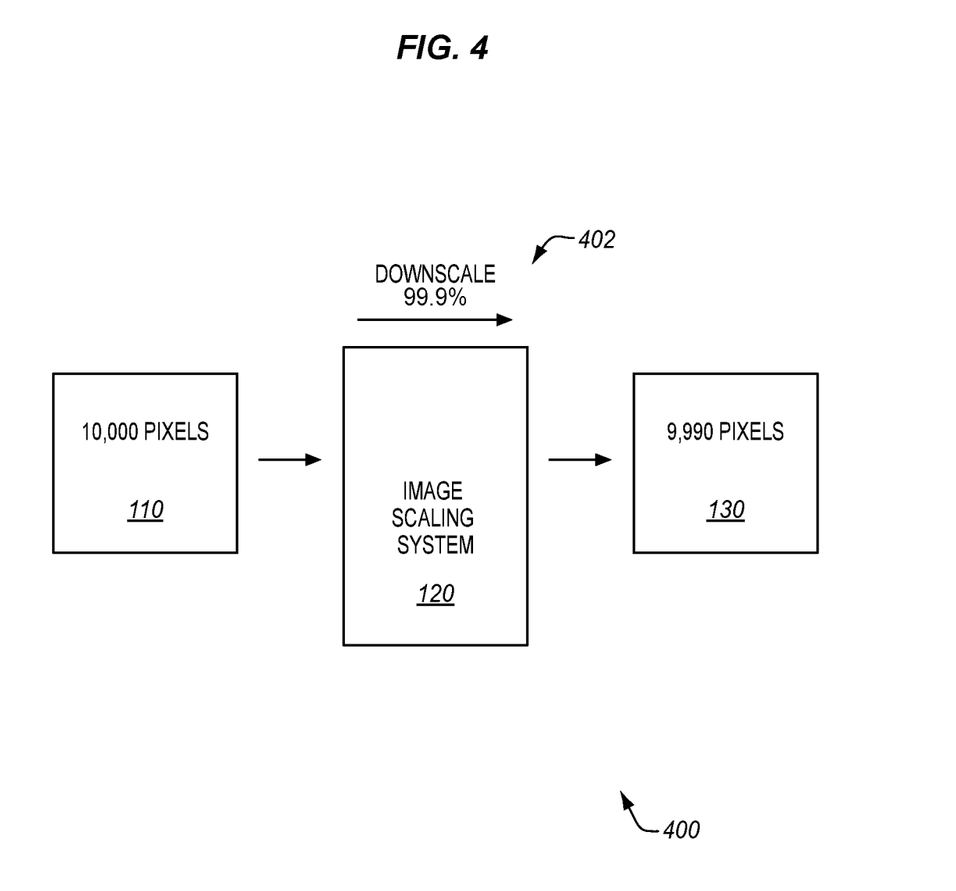
FIG. 4 illustrates a diagram of the image scaling system downscaling the input image in an illustrative embodiment.

In step 302, the interface 214 receives an instruction to scale an input image by a scale factor 402 to create an output image. The scale factor 402 may be expressed as a percentage of the size of input image 110 to increase or decrease in one or more directions in creating the output image 130. FIG. 4 illustrates a diagram 400 of the image scaling system 120 downscaling the input image 110 in an illustrative embodiment. In particular, the image scaling system 120 in this example downscales the input image 110 by a scale factor 402 of 99.9%. Thus, if the input image 110 included 10,000 pixels, the image scaling system 120 removes 10 pixels from the input image 110 to create the output image 130 having 9,990 pixels, and a count of 10 pixels may be removed with 10 sequences 604 for the reasons that will be explained below. So-called small scale factors (e.g., <1% change to the input image 110) may be desirable, for example, to compensate for paper shrinking as a result of applying wet ink and drying to fix the ink to the paper. Alternatively or additionally, the image scaling system 120 may be configured to receive user selection of the scale factor 402 via the GUI 218.

Figure 5:
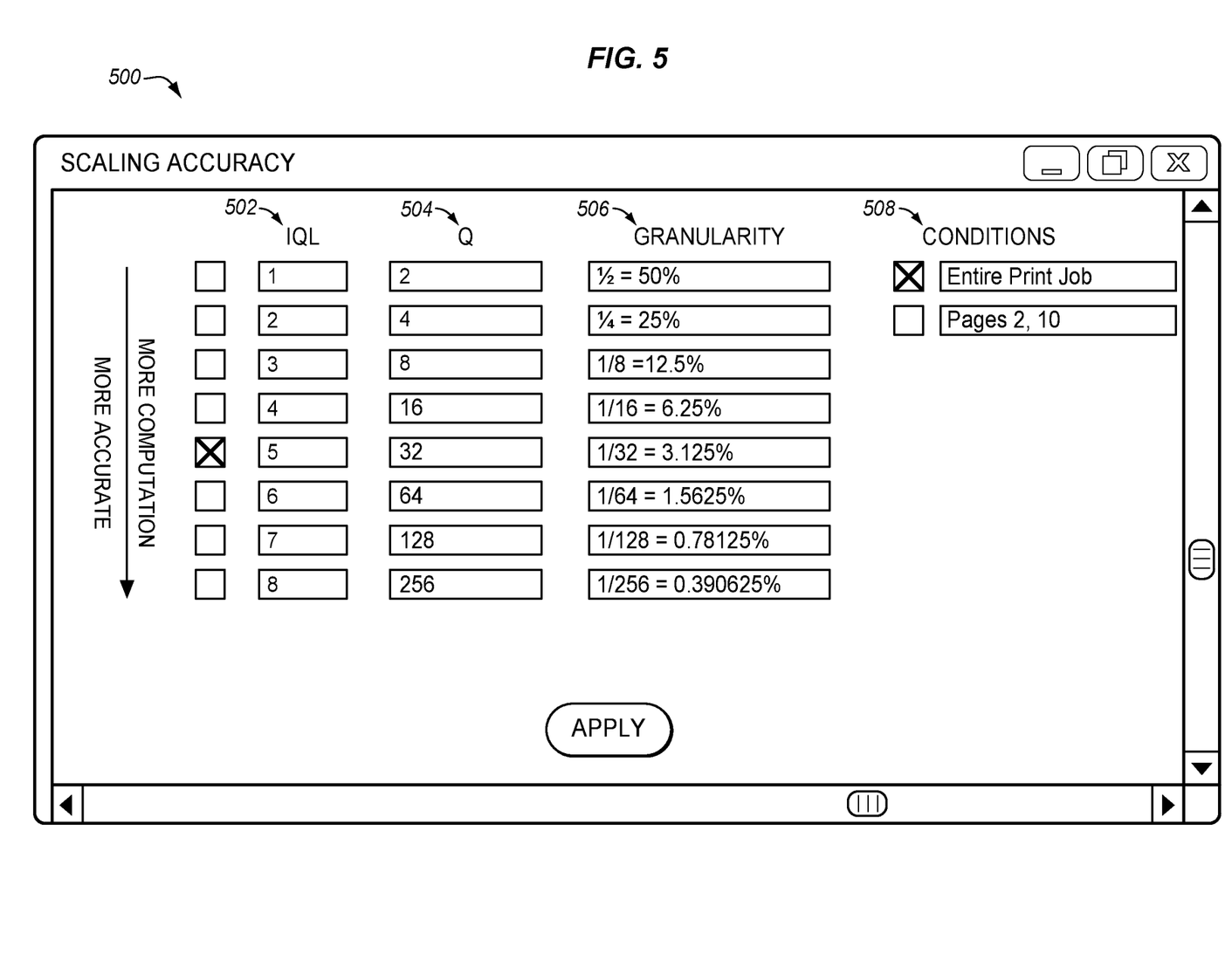
FIG. 5 illustrates a graphical user interface presenting options for selecting an integer quality level in an illustrative embodiment.

Returning to FIG. 3, in step 304, the image scaling system 120 determines an integer quality level to use in scaling the input image to the output image. In one embodiment, the image scaling system 120 automatically selects the integer quality level 502 based on the scale factor 402 and the size of the image. The selection of integer quality level 502 may further apply a look up table or an algorithm determined from prior performance testing. Alternatively or additionally, the image scaling system 120 may be configured to receive user selection of the integer quality level via the GUI 218. FIG. 5 illustrates a graphical user interface 500 presenting options for selecting an integer quality level in an illustrative embodiment. In this example, a user may select/apply an integer quality level 502 that is an integer ranging from 1 to 8. The integer quality level 502 corresponds with a value, a Q value 504, which is a power of two of the integer quality level 502. The Q value 504, in turn, corresponds with a granularity 506 that is an inverse of the Q value 504. The granularity 506 is an amount by which pixels in the input image 110 are to be approximated for converting to pixels in the output image 130.

As will be described in greater detail below, since the integer quality level 502 is an integer, and the Q value 504 is a power of two of that integer, pixels in the output image 130 may be obtained by performing integer multiplication and bit shifting, as opposed to pure area scaling techniques which calculate exact floating point values to obtain the output pixel values. Moreover, different integer values of the integer quality level 502 may be selected to achieve various balances of processing performance versus output quality. For instance, at an integer quality level 502 of 2, the granularity is low and pixels in the input image 110 are rounded to 25%. By contrast, at an integer quality level 502 of 8, the granularity is high to more accurately approximate pixels at a higher computation cost, yet the image scaling system 120 may still avoid the higher computation cost of calculating exact floating point values. As shown in FIG. 5, a user may also optionally select conditions 508 for which to apply the accuracy, such as an entire print job, particular images, or certain pages within a print job. For purposes of discussion, assume that the user has selected an integer quality level 502 of five, and thus a Q value 504 of 32, and a granularity 506 of 1/32, or 3.125%.

Figure 6:
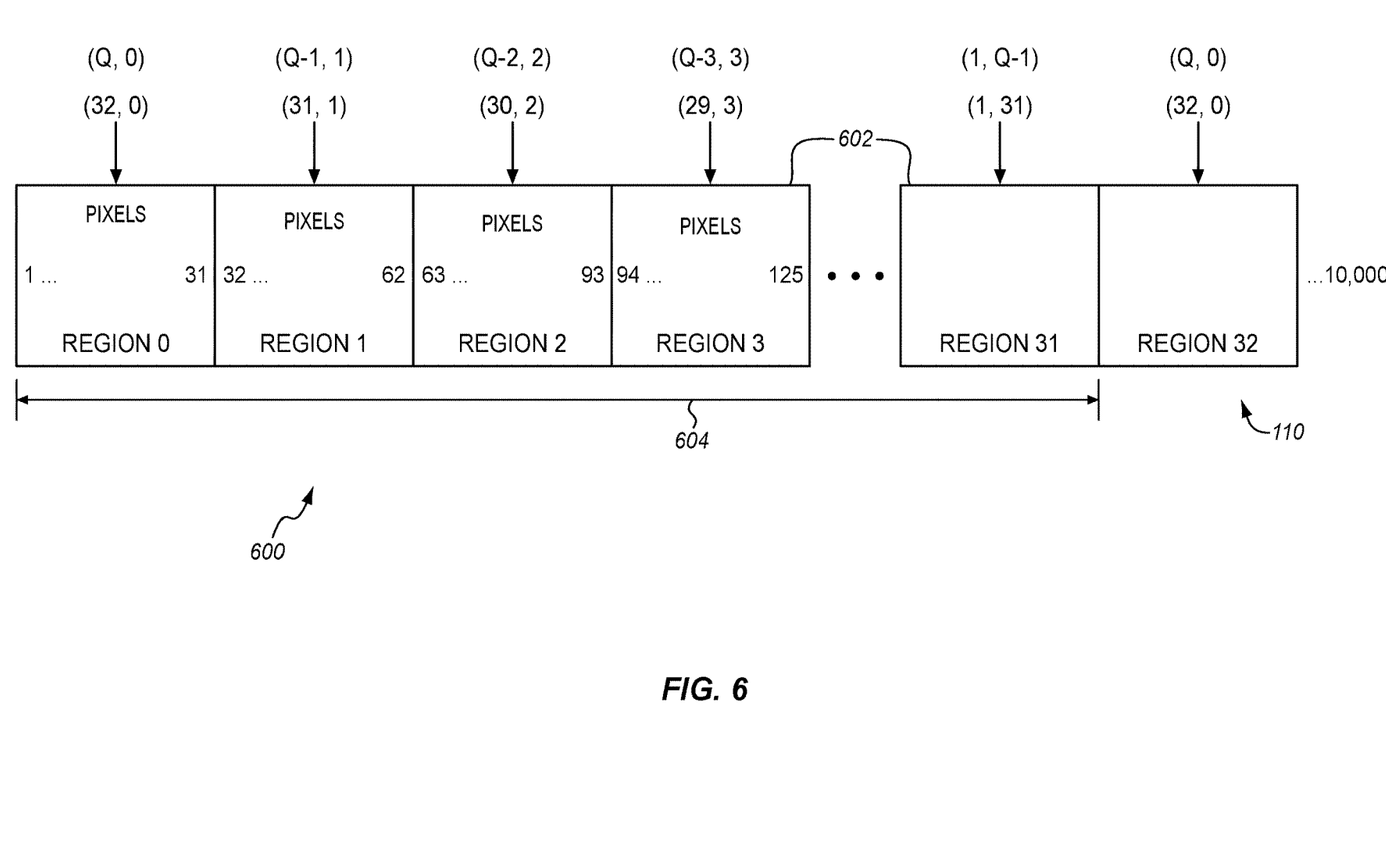
FIG. 6 illustrates a diagram of sectioning the input image into regions in an illustrative embodiment.

Returning again to FIG. 3, in step 306, the image scaling system 120 divides the input image 110 into regions of consecutive pixels based on the scale factor 402 and the integer quality level 502. That is, the image scaling system 120 may divide the input image 110 into sequences of regions based on the scale factor 402 wherein each sequence removes or adds one pixel to the output image 130, and also divide the input image 110 each sequence into regions of consecutive pixels based on the integer quality level 502. FIG. 6 illustrates a diagram 600 of dividing (i.e., sectioning) the input image 110 into regions in an illustrative embodiment. FIG. 6 continues the examples set out above in FIGS. 4-5. In particular, with a selected Q value 504 of 32, the image scaling system 120 divides pixels in the input image 110 into 32 regions 602 of a sequence 604 (e.g., Region 0 to Region 31 belong to a sequence 604). In other words, the image scaling system 120 divides the pixels of the sequence 604 of the input image 110 into a number of regions 602 equal to the Q value 504.

In one embodiment, the image scaling system 120 determines the number of pixels per output image by multiplying 1 minus the scale factor 402 by the number of pixels in the output. Then the image scaling system 120 may determine the number of sequences 604 to produce by calculating the difference between the number of pixels in the output image 130 and the number of pixels in the input image 110, and the number of pixels in each sequence 604 by dividing the number of pixels in the input image 110 by the number of sequences 604. The image scaling system may further determine the number of pixels per region by dividing the number of pixels in the sequence 604 by the Q value 504. For example, for a scale factor 402 of 99.9%, the number of sequences is 10,000 times 1-99.9% (0.1%), or 10, and thus the number of pixels per sequence is 10,000 divided by 10, or 1,000 times 1-99.9% (0.1%), or 10, and the number of pixels in a region is the number of pixels in a sequence divided by the Q value 504, resulting in 31.25. In another embodiment, the image scaling system 120 obtains the number of pixels per region by dividing the granularity 506 by the scale factor per pixel. For example, for a scale factor 402 of 99.9%, the scale factor per pixel is 0.1%, and thus the number of pixels per region is 3.125% divided by 0.1%, or 31.25. The number of pixels in the sequence is 31.25 times 32 regions 602 resulting in 1,000 total pixels for each of the 10 sequences 604. The image scaling system 120 may round the result (e.g., 31.25) to integers to prevent the accumulation of positional error. Thus, as shown in FIG. 6, Region 0 includes pixels 1 to 31 (i.e., 31 pixels), Region 1 includes pixels 32 to 62 (i.e., 31 pixels), Region 2 includes pixels 63 to 93 (i.e., 31 pixels), and Region 3 includes pixels 94 to 125 (i.e., 32 pixels).

Figure 7:
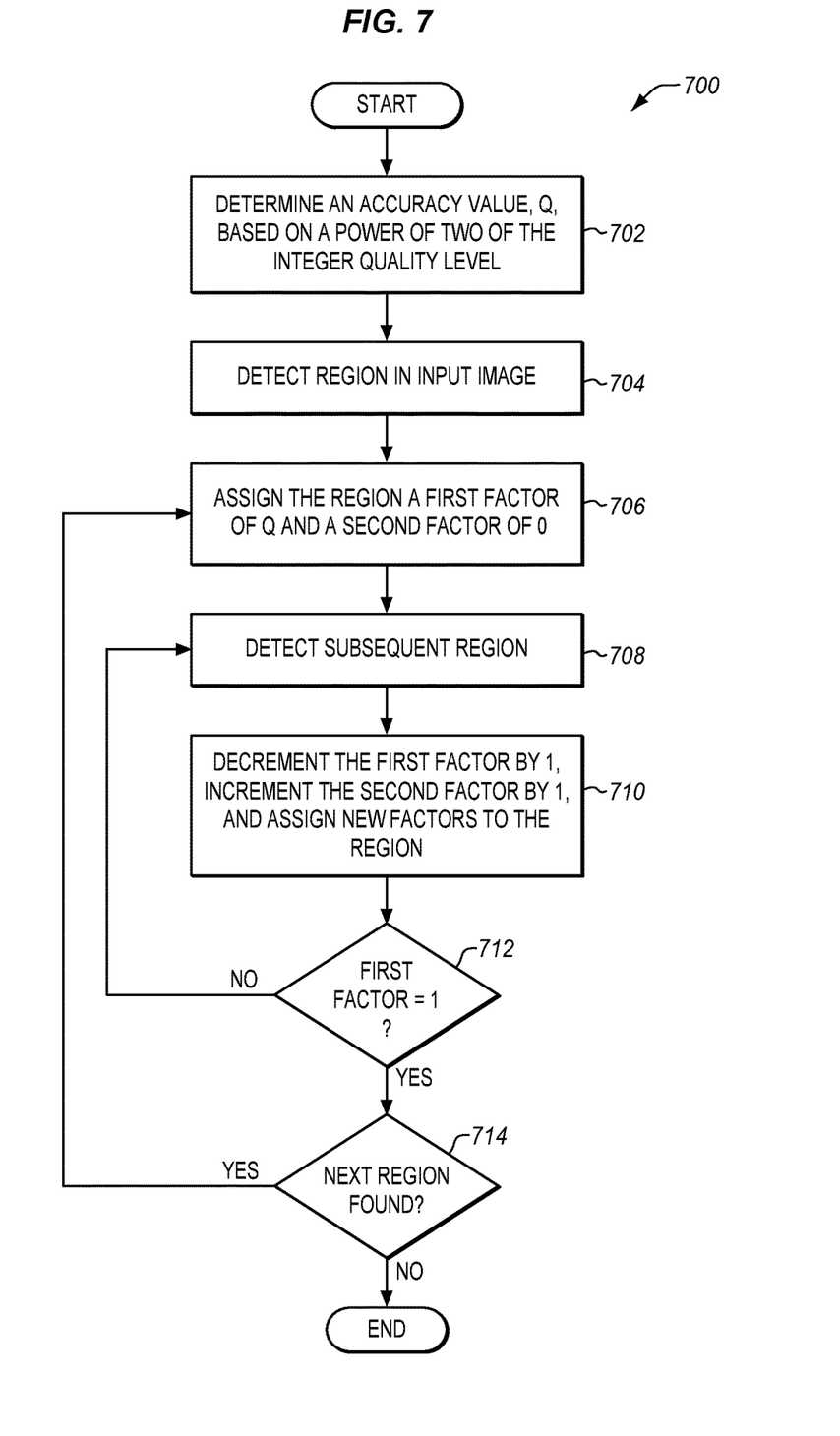
FIG. 7 a flowchart illustrating a method of determining a first factor and second factor for the regions in an illustrative embodiment.

Returning once again to FIG. 3, in step 308, the image scaling system 120 determines a first factor and a second factor to apply to each of the regions 602 based on a power of two of the integer quality level. In other words, image scaling system 120 determines region factors corresponding to each of the regions 602. FIG. 7 a flowchart illustrating a method 700 of determining a first factor and second factor for the regions 602 in an illustrative embodiment. The steps of method 700 are described with reference to the image scaling system 120 and examples of previous figures, but those skilled in the art will appreciate that method 700 may be performed in other systems and be applicable to alternative examples.

In step 702, the image scaling system 120 determines an accuracy value, or the Q value 504, based on a power of two of the integer quality level 502. In continuing with the examples set out above, let the Q value 504 in this instance be 32. In step 704, the image scaling system 120 detects a region 602 in the input image 110. In step 706, the image scaling system 120 assigns the region 602 a first factor set to the Q value 504, and assigns the region 602 a second factor set to 0. In step 708, the image scaling system 120 detects a subsequent region 602. In step 710, the image scaling system 120 decrements the first factor by 1, increments the second factor by 1, and assigns the new factors to this region 602. If in step 712 the first factor is not yet decremented to 1, steps 708-712 are repeated for the next region 602. Otherwise, the next region 602 for the next sequence 604 is detected in step 714. If another region 602 is found step 714, the method 700 returns to step 706 and the factors are reset for the next region 602 (e.g., a new sequence 604 begins). Otherwise, the method 700 may end. The method 700 may be repeated for all regions 602 of the input image 110.

Results of step 308 of FIG. 3 and the method 700 of FIG. 7 are illustrated in FIG. 6. In this example, the image scaling system 120 has assigned Region 0 a first factor set to the Q value 504 (e.g., 32) and a second factor set to 0. Next, Region 1 is assigned a first factor of 31 and a second factor of 1, Region 2 is assigned a first factor of 30 and a second factor of 2, and so on through Region 31. Region 31 is the end of the sequence 604, with a first factor of 1 and a second factor of 31. Therefore, the image scaling system 120 resets the first factor and the second factor for the next region, Region 32, and this pattern is repeated for all pixels (e.g., 10,000 pixels) of the input image 110.

Figure 8:
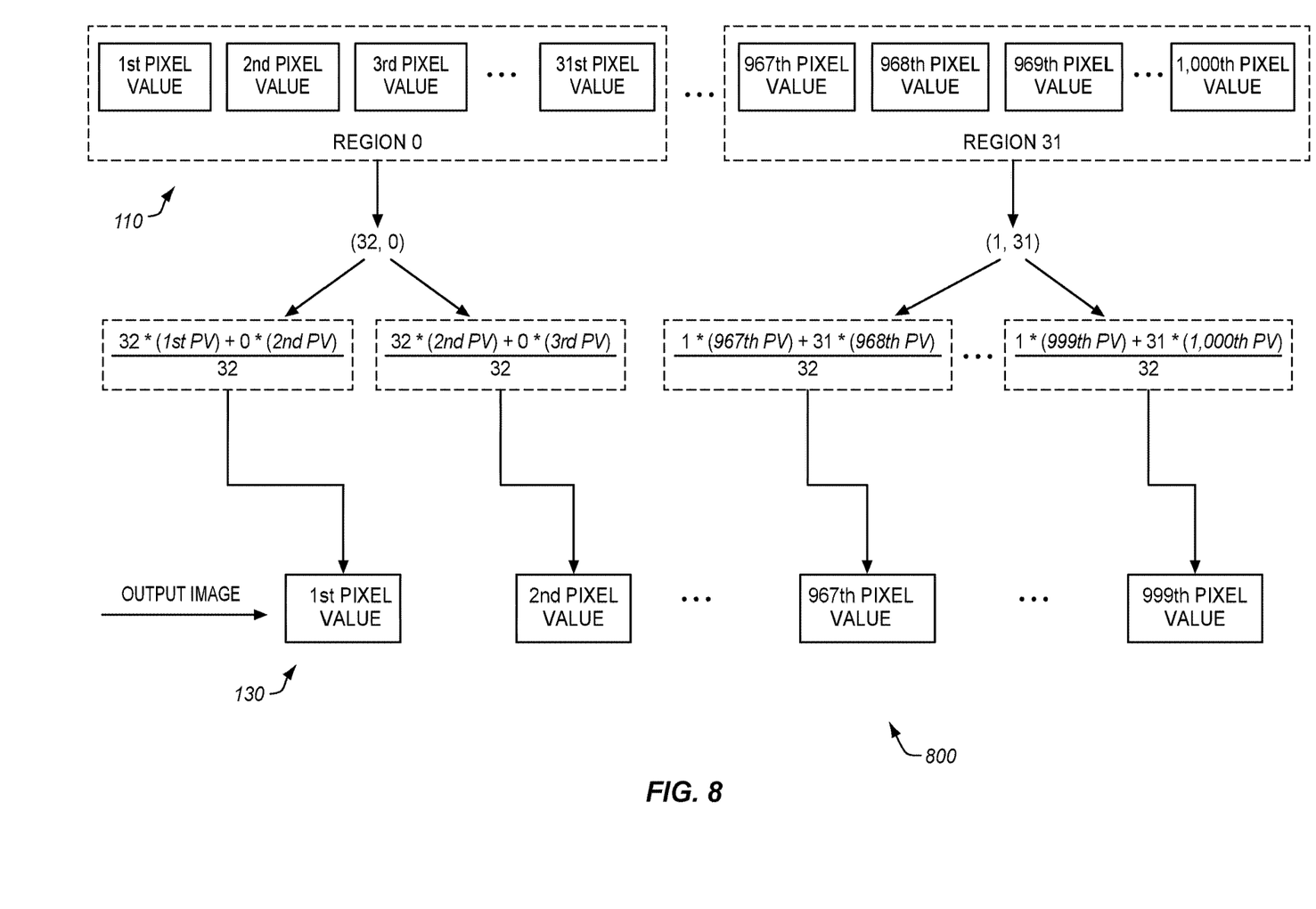
FIG. 8 illustrates a diagram of applying the first factor and the second factor to pairs of pixels in the input image to create output pixels in the output image.

Returning to FIG. 3, in step 310, the image scaling system 120 scales the input image 110 by applying the first factor and the second factor to consecutive pairs of pixels in the input image 110 to create output pixels in the output image 130. FIG. 8 illustrates a diagram 800 of applying the first factor and the second factor to consecutive pairs of pixels in the input image 110 to create output pixels in the output image 130. FIG. 8 continues the example set forth above with respect to FIG. 6. In particular, the input image 110 includes Region 0 with pixels 1 to 31, and Region 31 with pixels 967 to 1000. Regions 0 and 31 are examples shown in FIG. 8 and described here for purposes of discussion, and it will be appreciated that step 310 may apply to all regions 602 and pixels of the input image 110. In step 312, the output image is transmitted to output device 150 (e.g., to the printer 260 for printing on the print medium 280).

In converting the input image 110 to create the output image 130, the image scaling system 120 applies the first factor to a first pixel value in a consecutive pair of pixels, and applies the second factor to a second pixel value in the pair. For example, as shown in FIG. 8 with respect to obtaining a first pixel value in the output image 130, the image scaling system 120 multiplies a first pixel value of the input image 110 by 32 and multiplies a second pixel value of the input image 110 by 0. In other words, for Region 0, the image scaling system 120 uses all of the first pixel value in a pair and none of the second pixel value in the pair to create a pixel value in the output image 130. The factoring of (32, 0) applies to calculations for each pixel corresponding to Region 0. For instance, the second pixel in the output image 130 is obtained by multiplying the second pixel value in the input image 110 by 32, multiplying the third pixel value in the input image 110 by 0, adding the result, and dividing by 32. In one embodiment, for regions for which the second factor is 0 (e.g., Region 0, Region 32, etc.), the image scaling system 120 may avoid calculations by incorporating the pixel values of the input image 110 into the output image 130 for each pixel corresponding to that region. Note that for a given number X of input pixels, the image scaling system 120 may use a number X−1 input pixel pairs to obtain a number X−1 of output pixels. Therefore, one pixel may be removed for each sequence 604, and the image scaling system 120 may select/determine the number of sequences 604 to be equal to the number of pixels to be removed.

To create the $967^{th}$ pixel of the output image 130, the image scale system 120 applies the factors of Region 31. As earlier described, Region 31, in this example, is assigned a factoring of (1, 31). Therefore, the first pixel value in a pair is multiplied by 1, the second pixel value in a pair is multiplied by 31, those results are added, and then divided by 32. In other words, for Region 31, $\frac{1}{32}$ of a first pixel value is used and $\frac{31}{32}$ of a second pixel value is used to create an output pixel. The factoring of (1, 31) applies to each pixel corresponding to Region 31. Thus, to create the $999^{th}$ pixel in the output image 130, the $999^{th}$ pixel value in the input image 110 is multiplied by 1, the $1000^{th}$ pixel value in the input image 110 is multiplied by 31, the results are added, and that result is divided by 32.

In view of the above, the image scaling system 120 may implement the following equation for the factors to obtain the value of a pixel in the output image 130:

Output pixel value=$((1^{st}$ input pixel value in pair)* $(Q-$Region #$)+(2^{nd}$ input pixel value in pair)* (Region #$))/Q$  Equation (1)

Put another way, the calculation of any given output pixel includes a numerator that is an integer and a denominator that is a power of two. Therefore, the image scaling system 120 is able to scale images at various levels of accuracy by performing integer multiplication and division by bit shifting (i.e., arithmetic shifting), thereby significantly reducing computation for scaling images as compared to performing floating point calculations. Moreover, the first factor and the second factor described above may apply to a large run of consecutive pixels in the input image 110 (e.g., pixels belonging to a region), and thus the input image 110 is approximated without continuously calculating new pixel pair conversion values. Still further, the techniques described above with respect to the method 300 enables, for example, a print operator of the printing system 250 to increase or decrease accuracy as needed. Since certain images sometimes print with artifacts unexpectedly, the image scaling system 120 provides an easily adjustable image scaling solution that achieves the desired balance of output quality versus time to process images for printing.

Figure 9:
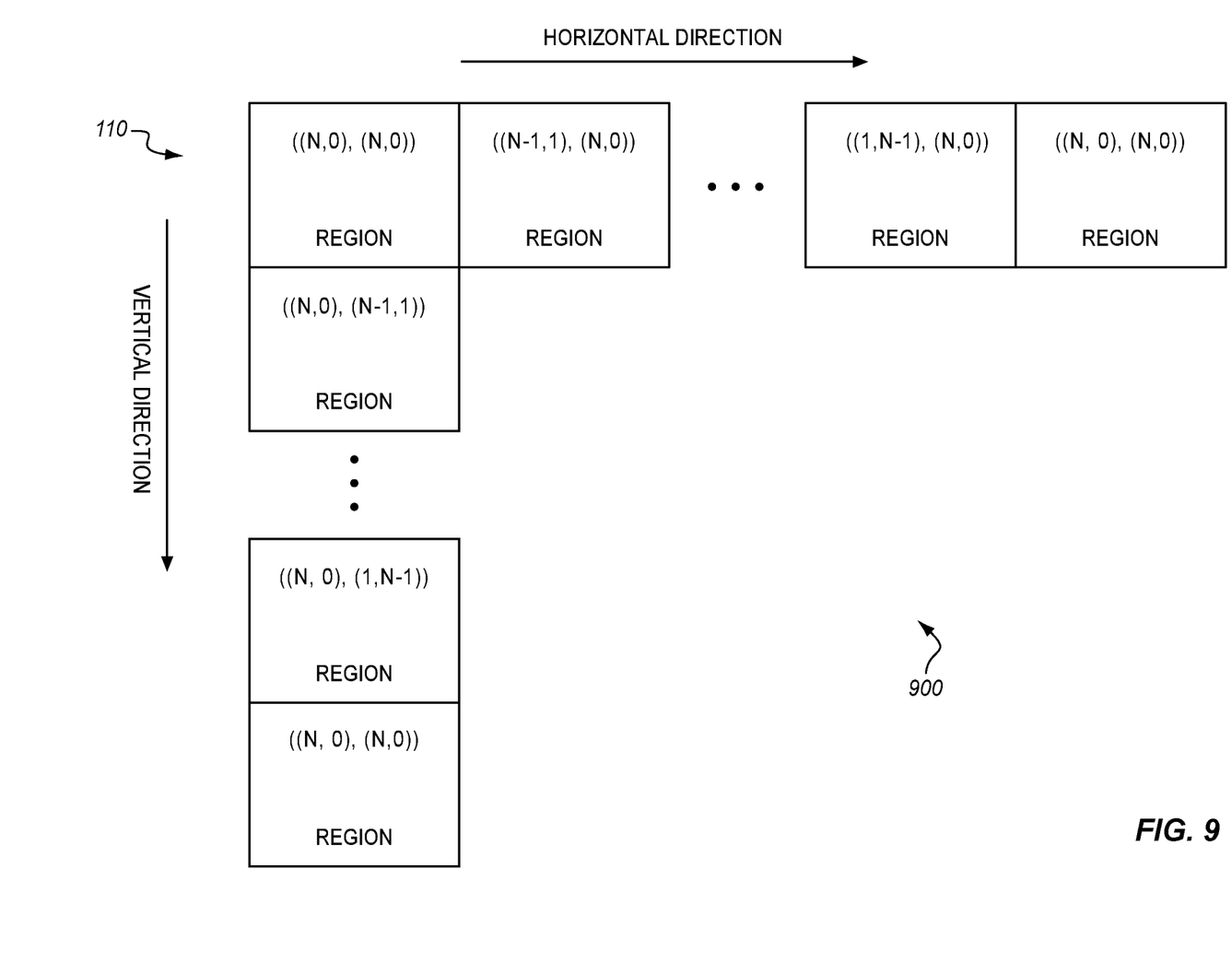
FIG. 9 is a diagram illustrating the conversion factors applied to the input image in two directions that may be orthogonal to each other.

The discussion of scaling images with respect to FIGS. 3-8 relate to a line of linear pixels to more clearly illustrate the concepts of the image scaling techniques of the image scaling system 120. It will be appreciated, however, that the concepts discussed therein apply to images and thus apply to pixels in two dimensions. FIG. 9 is a diagram 900 illustrating the conversion factors applied to the input image 110 in two directions that may be orthogonal to each other. In scaling in two directions, the image scaling system 120 may apply a first set of factors in a horizontal direction (e.g., process direction) and a second set of factors in a vertical direction (e.g., scan line), thus applying a total of four factors to obtain a pixel value in the output image 130. That is, factors may be grouped in four, with the upper-left region having ((N, 0), (N, 0)) and the region below it having ((N, 0), (N−1, 1)), and so on. The first factor in the second set decreases by 1 and the second factor in the second set increases by 1 for every region. After ((N, 0), (1, N−1)), the regions repeat (e.g., as a sequence) for the additional scan lines.

Since the factors are calculated in two directions, the image scaling system 120 obtains an output pixel value as the sum of four factors, where the first factor times the third factor is used to multiply the first pixel's value, and then added to the second factor times the third factor multiplied by the second pixel's value. Added to this is the first factor times the fourth factor multiplied by the third pixel's value (the pixel below the first one), and also the second factor times the fourth factor multiplied by the fourth pixel's value (the pixel below the second one). The result is then divided by the Q value 504 (by bit shifting right twice by the power of 2 used for precision, so bit shifting right 10 according in this example). As such, the image scaling system 120 is able to scale the same or differently in both directions. In some embodiments, the image scaling system 120 may expand the image in one direction while simultaneously reducing the image in the other direction.

Furthermore, although a downscaling example is used for purposes of discussion, it will be appreciated that the concepts described above may also apply to upscaling and to alternative scale factors. For example, in scaling to increase the size, like a 101% target size of the input image 110, the image dimension of 24,000 pixels results in 24,240 pixels. As such, the image scaling system 120 may, in continuing with the example above, break up the sequence into 32 regions (or $2^N$) where each region uses the scale factor 402 as earlier described. To get 101 pixels from 100 pixels, the image scaling system 120 may copy the first and last output pixel of each region from the first and last input pixel (2 pixels) and derive the middle 99 pixels from pairs of input pixels (99 pairs) using the factors described above and then copy the first and last output pixel of each region from the first and last derived output pixels (2 pixels). In other words, the image scaling system 120 may apply factors of pairs to the middle pixels and copy the end pixels. Similar to removing pixels as previously stated, the image scaling system 120 may select/determine the number of sequences 604 to match the number of pixels to be added.

In one embodiment, the steps of method 300 may be applied to small scale factors (e.g., a few percent at most for large images) to compensate for paper shrinkage in the print system 250. In another embodiment, the image scaling system 120 applies a minimum number of pixels in a region as $2^N$ for upscaling, or $2^{N+1}$ for downscaling, where N is the integer quality level. As such, a minimum image size may be $2^{N+1}$ and some images may not increase in quality beyond a certain point. If N is 8, for example, the image may be at least 512 pixels wide or so, with regions that are 2 pixels wide. By contrast, at low levels of quality, for example, if N is 2, the image may be smaller since the minimum width of the image may be as low as 8, and the amount of scaling may be up to 25%. That is to say, the scaling techniques described above may not be exact for a region. The last pixel in a region may be computed with the first pixel in the next region. It is the sequence 604 of regions 602 that enables elimination or addition of a single pixel. As such, the pairing of factors may not end at an even pixel boundary per region. For example, with reference to FIG. 8, the Region 0 of the output image 130 may blend a $31^{st}$ pixel value with a $32^{nd}$ pixel value even though the $32^{nd}$ pixel value comes from Region 1.

Figure 10:
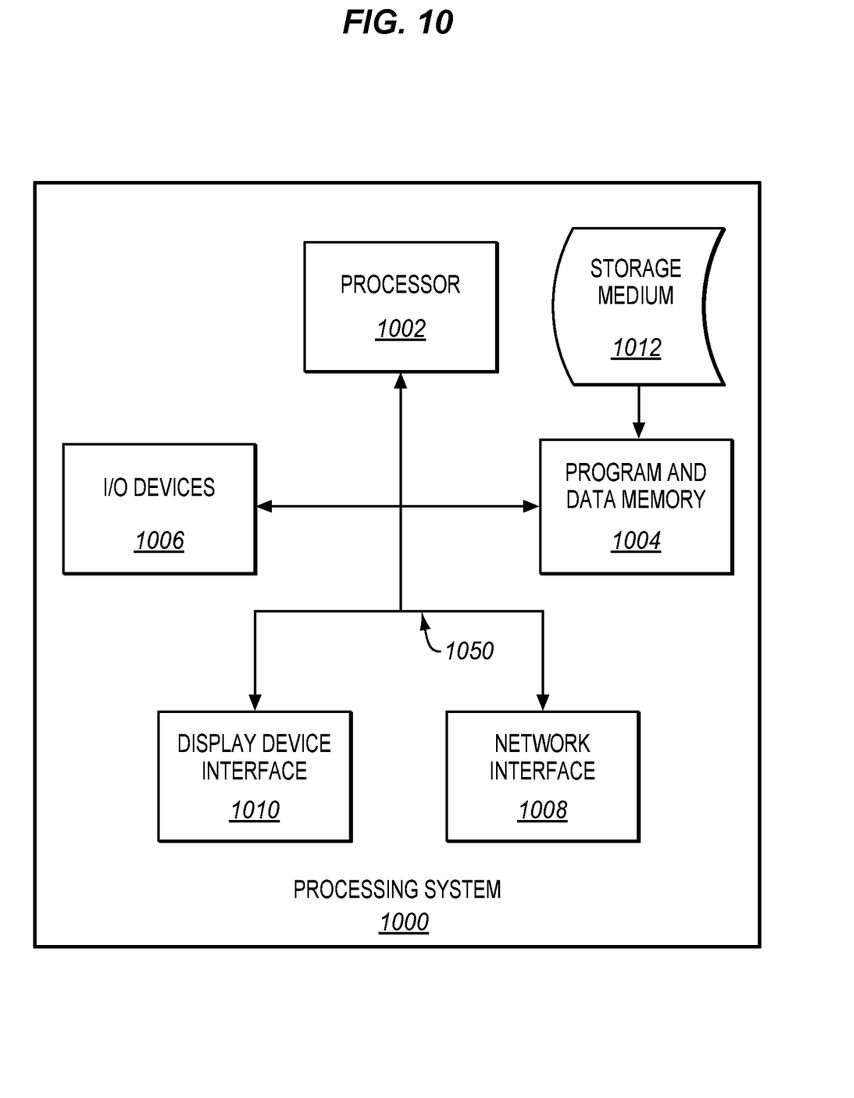
FIG. 10 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image scaling system 120 to perform the various operations disclosed herein. FIG. 10 illustrates a processing system 1000 operable to execute a computer readable medium embodying programmed instructions to perform desired functions in an illustrative embodiment. Processing system 1000 is operable to perform the above operations by executing programmed instructions tangibly embodied on computer readable storage medium 1012. In this regard, embodiments of the invention can take the form of a computer program accessible via computer readable storage medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 may be integrated with the system to interface to one or more display devices, such as printing systems and screens for presentation of data generated by processor 1002.

Although specific embodiments are described herein, the scope of the disclosure is not limited to those specific embodiments. The scope of the disclosure is defined by the following claims and any equivalents thereof.

What is claimed is:

1. An image scaling system comprising:
a processor configured to receive an instruction to scale an input image by a scale factor to create an output image; and
the processor configured to determine an integer quality level to use in scaling the input image to create the output image, to divide the input image into regions of consecutive pixel pairs based on the scale factor and the integer quality level, to determine region factors corresponding to each of the regions;
the processor configured to scale the input image by applying the region factors to pairs of pixels in the corresponding regions of the input image to create output pixels in the output image.

2. The image scaling system of claim 1 wherein:
the processor is configured to determine a first factor and a second factor to apply to each of the regions based on a power of two of the integer quality level, wherein the first factor of a first region is a power of two of the integer quality level and decrements by one for subsequent regions, and wherein the second factor of the first region is zero and increments by one for the subsequent regions; and the processor is configured to scale the input image by applying the first factor and the second factor to the pairs of pixels in the input image to create the output pixels in the output image.

3. The image scaling system of claim 2 wherein:
in response to determining that the first factor is decremented to one, the processor is configured to reset the first factor to the power of two of the integer quality level, to reset the second factor to zero, and to assign the first factor and the second factor to a subsequent region; and
for further regions after the subsequent region, the processor is configured to iteratively decrement the first factor and increment the second factor.

4. The image scaling system of claim 1 wherein:
the processor is configured to determine a number of pixels to belong to each of the regions by dividing an inverse of the power of two of the integer quality level by the scale factor per pixel.

5. The image scaling system of claim 1 wherein:
the processor is configured to scale the input image in two directions.

6. The image scaling system of claim 1 further comprising:
a graphical user interface configured to receive user input indicating the integer quality level.

7. The image scaling system of claim 1 further comprising:
a graphical user interface configured to receive user input indicating the scale factor.

8. A method of scaling an input image, the method comprising:
receiving an instruction to scale an input image by a scale factor to create an output image;
determining an integer quality level to use in scaling the input image to create the output image;
dividing the input image into regions of consecutive pixels based on the scale factor and the integer quality level;
determining region factors corresponding to each of the regions; and
scaling the input image by applying the region factors to pairs of pixels in the corresponding regions of the input image to create output pixels in the output image.

9. The method of claim 8 further comprising:
determining a first factor and a second factor to apply to each of the regions based on a power of two of the integer quality level, wherein the first factor of a first region is a power of two of the integer quality level and decrements by one for subsequent regions, and wherein the second factor of the first region is zero and increments by one for the subsequent regions; and
in response to determining that the first factor is decremented to one:
resetting the first factor to the power of two of the integer quality level;
resetting the second factor to zero; and
assigning the first factor and the second factor to a subsequent region.

10. The method of claim 9 further comprising:
for further regions after the subsequent region, iteratively decrementing the first factor and incrementing the second factor.

11. The method of claim 8 further comprising:
determining a number of pixels to belong to each of the regions by dividing an inverse of the power of two of the integer quality level by the scale factor per pixel.

12. The method of claim 8 further comprising:
scaling the input image in two directions.

13. The method of claim 8 further comprising:
receiving, via a graphical user interface, user input indicating the integer quality level.

14. A non-transitory computer readable medium embodying programmed instructions which, when executed by a processor, are operable for performing a method of scaling an input image, the method comprising:
receiving an instruction to scale an input image by a scale factor to create an output image;
determining an integer quality level to use in scaling the input image to create the output image;
dividing the input image into regions of consecutive pixels based on the scale factor and the integer quality level;
determining region factors corresponding to each of the regions; and
scaling the input image by applying the region factors to pairs of pixels in the corresponding regions of the input image to create output pixels in the output image.

15. The medium of claim 14, the method further comprising:
determining a first factor and a second factor to apply to each of the regions based on a power of two of the integer quality level, wherein the first factor of a first region is a power of two of the integer quality level and decrements by one for subsequent regions, and wherein the second factor of the first region is zero and increments by one for the subsequent regions; and
in response to determining that the first factor is decremented to one:
resetting the first factor to the power of two of the integer quality level;
resetting the second factor to zero; and
assigning the first factor and the second factor to a subsequent region.

16. The medium of claim 15, the method further comprising:
for further regions after the subsequent region, iteratively decrementing the first factor and incrementing the second factor.

17. The medium of claim 14, the method further comprising:
determining a number of pixels to belong to each of the regions by dividing an inverse of the power of two of the integer quality level by the scale factor per pixel.

18. The medium of claim 14, the method further comprising:
scaling the input image in two directions.

19. The medium of claim 14, the method further comprising:
receiving, via a graphical user interface, user input indicating the integer quality level.

20. The medium of claim 14, the method further comprising:
receiving, via a graphical user interface, user input indicating the scale factor.

* * * * *